March 30, 1948.  G. C. SZIKLAI  2,438,831
VOLTAGE REGULATING RECTIFYING CIRCUITS
Filed Feb. 24, 1944  2 Sheets-Sheet 1
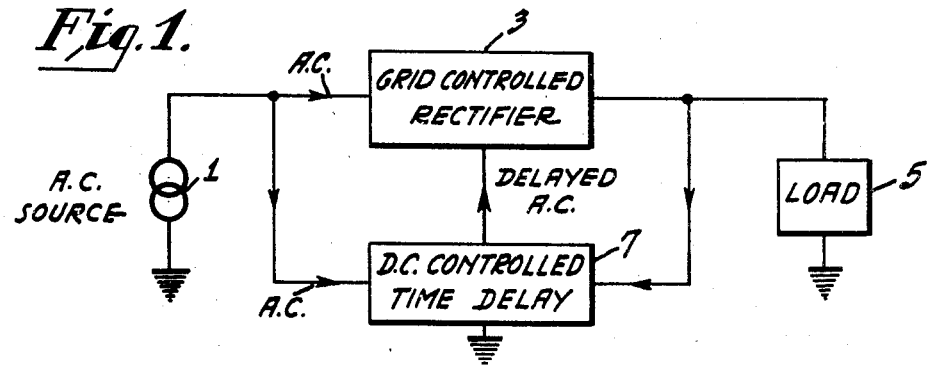
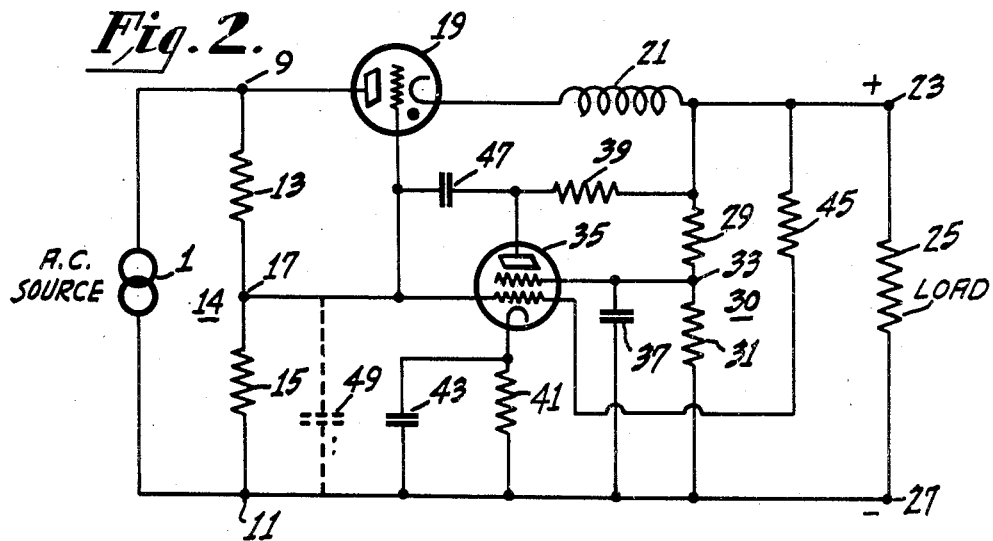
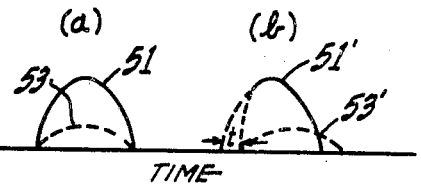
Inventor
GEORGE C. SZIKLAI
By
Attorney March 30, 1948.  G. C. SZIKLAI  2,438,831
VOLTAGE REGULATING RECTIFYING CIRCUITS
Filed Feb. 24, 1944　　2 Sheets-Sheet 2
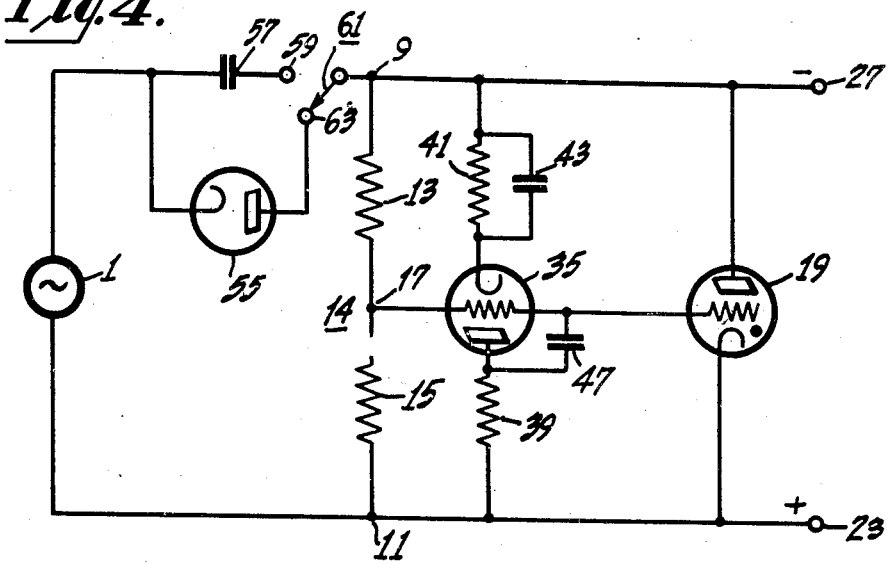
*Fig. 4.*
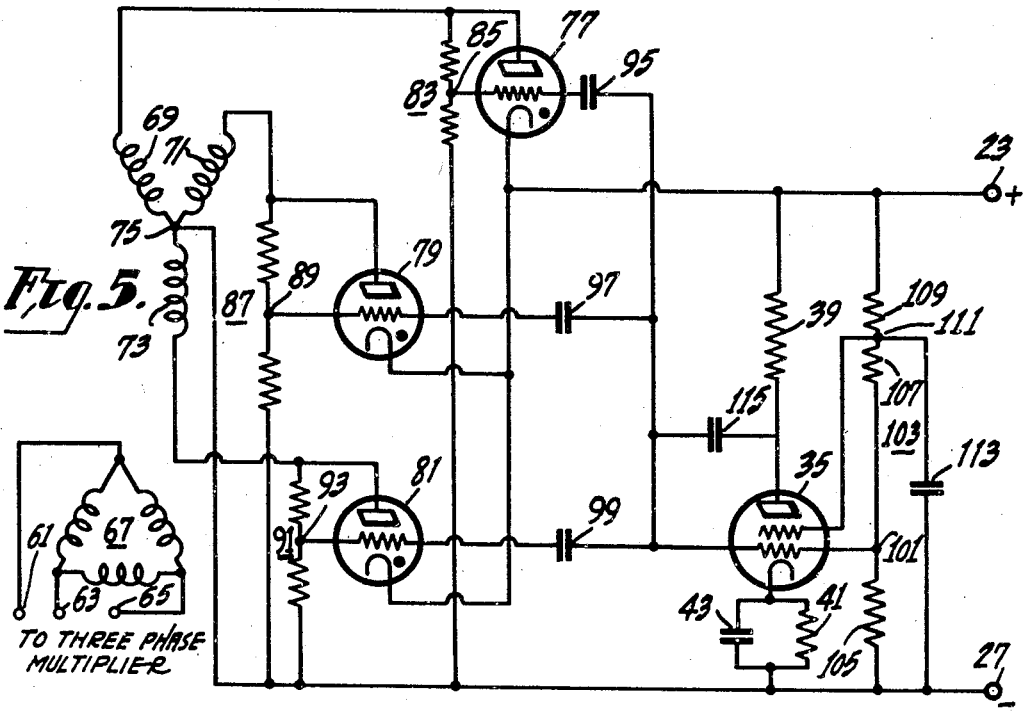
*Fig. 5.*
TO THREE PHASE MULTIPLIER
Inventor
GEORGE C. SZIKLAI
By
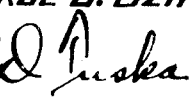
Attorney Patented Mar. 30, 1948

2,438,831

UNITED STATES PATENT OFFICE 2,438,831

VOLTAGE REGULATING RECTIFYING CIRCUITS

George C. Sziklai, Princeton, N. J., assignor to Radio Corporation of America, a corporation of Delaware Application February 24, 1944, Serial No. 523,731

13 Claims. (Cl. 175—363)

This invention relates generally to electrical control apparatus and more particularly to improved voltage regulating rectifier circuits for single phase and multi-phase alternating voltage sources.

Various types of voltage regulating circuits have been employed heretofore wherein a portion of the alternating or direct voltage applied to a load is employed to regulate a series or parallel connected impedance device interposed between the power source and the load. In many instances the regulating device comprises a thermionic tube having its impedance varied by means of the control voltage derived from the load circuit.

The instant invention comprises a grid-controlled gaseous discharge rectifier tube interposed between the alternating voltage source and the load, and a reactance tube responsive to a portion of the rectified load voltage wherein variations of the mutual conductance of the reactance tube are employed to vary the phase of the alternating potential applied to the grid of the grid-controlled gaseous discharge rectifier tube. Variations in the load potential therefore provide control of the conducting interval of the rectifier tube during each cycle of the applied alternating potential. A filter including a series reactor interposed between the rectifier tube and the load smooths the rectified voltage pulses, thereby providing an effective load voltage proportional to the integrated rectified voltage pulses.

A first embodiment of the invention employs a grid-controlled gaseous discharge rectifier tube serially connected between the alternating voltage source and the load. A second embodiment of the invention employs a grid-controlled gaseous discharge rectifier tube connected in parallel with the load. A third embodiment of the invention includes a three phase alternating potential source applied to the control apparatus through a Y-connected transformer secondary, separate grid-controlled gaseous discharge rectifier tubes connected between each of the Y sections of the transformer secondary and the common positive load terminal. The reactance tube is responsive to a portion of the rectified load voltage, and is employed to adjust the phase of the alternating potentials separately applied to the grid electrodes of each of the rectifier tubes.

Among the objects of the invention are to provide an improved method of and means for rectifying and controlling the voltage of an alternating voltage source connected to a load. Another object of the invention is to provide an improved voltage regulated rectifier circuit for an alternating voltage source wherein the conducting interval per cycle of the rectifier is controlled by the rectified output voltage. A further object of the invention is to provide an improved voltage controlled rectifier circuit wherein a grid controlled gaseous rectifier tube is serially interposed between an alternating voltage source and a load, and wherein the load voltage is employed to vary the rectifying tube conducting interval during each cycle of the applied alternating voltage. A further object of the invention is to provide an improved voltage controlled rectifier circuit wherein a grid controlled gaseous discharge rectifier tube is parallel-connected with a load device connected to an alternating voltage source, and wherein a portion of the load voltage is employed to vary the conducting interval of the rectifier tube during each cycle of the applied alternating voltage. An additional object of the invention is to provide an improved voltage controlled rectifier circuit for a multi-phase alternating potential source wherein each phase of the alternating source is separately rectified, the rectified phases are combined and a portion of the combined rectified voltages is employed to vary the conducting intervals of the separate phase rectifiers during each cycle of the applied alternating potential.

The invention will be further described by reference to the accompanying drawings of which Figure 1 is a block circuit diagram of the basic invention, Figure 2 is a schematic circuit diagram of one embodiment of the invention, Figure 3 is a pair of graphs illustrative of the circuit operation, Figure 4 is a schematic circuit diagram of a second embodiment of the invention and Figure 5 is a schematic circuit diagram of a third embodiment of the invention. Similar reference characters are applied to similar elements throughout the drawings.

Referring to Figure 1 of the drawing, an alternating potential source 1 is serially connected through a grid-controlled rectifier 3 to a load device 5. The rectified load voltage is applied to control a D.-C. controlled time delay network 7, which delays the application of the input alternating voltage to the control grid element of the grid-controlled rectifier 3. If desired, the time delay network 7 may include amplification to increase the sensitivity thereof and thereby provide higher load voltage stabilization. Variation of the phase of the applied alternating potential on the control grid of the grid-controlled rectifier 3 effectively varies the conducting interval of said rectifier during each cycle of the applied alternating potential, thereby regulating the voltage applied to the load 5. It should be understood that various types of grid-controlled rectifier networks and D.-C. controlled time delay networks may be employed, and that the specific circuits to be described in detail hereinafter are merely illustrative of the preferred embodiments of the invention.

Referring to Figure 2, the alternating potential source 1 is connected to the end terminals 9, 11 of a first voltage divider 14 comprising serially-connected resistors 13, 15 having a common terminal 17. The voltage divider terminal 9 is connected to the anode of a grid-controlled gaseous discharge rectifier tube 19. The cathode of the gaseous discharge rectifier tube 19 is serially connected through a reactor 21 to the positive terminal 23 of a load device 25. The voltage divider terminal 11 is connected to the negative terminal 27 of the load device 25.

A second voltage divider 30, comprising serially-connected resistors 29, 31, is connected in parallel with the load device 25. The common terminal 33 of the second voltage divider resistors 29, 31, is connected to the screen electrode of a tetrode or pentode thermionic reactance tube 35. The screen electrode of the reactance tube 35 is connected to the negative terminal 27 of the load device 25 through a first bypass capacitor 37. The anode of the thermionic reactance tube 35 is connected, through an anode resistor 39, to the positive terminal 23 of the load device 25. The cathode of the thermionic reactance tube 35 is connected to the negative load terminal 27 through a parallel-connected cathode resistor 41 and second bypass capacitor 43.

The positive terminal 23 of the load device 25 is connected, through a series resistor 45, to the control electrode of the reactance tube 35. The common terminal 17 of the resistors 13, 15 of the first voltage divider 14 is connected to the grid electrode of the gaseous discharge rectifier tube 19 and to the control electrode of the reactance tube 35. A coupling capacitor 47 is connected between the anode of the reactance tube 35 and the control grid of the gaseous discharge rectifier tube 19.

In operation, the rectifier tube 19 interposed between the alternating potential source 1 and the load 25 provides a rectified load potential which is effectively filtered by means of the series reactor 21. It will be seen that the portion of the alternating potential applied to the grid electrode of the rectifier tube 19 should be of proper phase to bias the rectifier for the alternating potentials applied across its anode and cathode electrodes. The coupling capacitor 47, the reactance tube 35 and the cathode capacitor 43 provide an effective capacitance 49, indicated by dash lines, connected between the grid electrode of the rectifier tube 19 and the negative load terminal 27, whereby the capacitor 49 is connected effectively in parallel with the resistor 15 of the first voltage divider. The effect of the capacitor 49 is to provide a delay of the alternating potentials from the source 1 applied to the grid electrode of the rectifier tube 19 which thereby reduces the conducting interval of the rectifier tube 19 during each cycle of the applied alternating voltage.

By proper selection of the anode resistor 39 and cathode resistor 41 of the reactance tube 35, the load voltage applied to the control electrode of the reactance tube may be employed to vary the time delay of the alternating potential applied to the grid of the rectifier tube from a small initial value to a half cycle of the applied alternating potential. As the voltage across the load device 25 increases, the direct voltage bias developed upon the control electrode of the reactance tube 35 by means of the resistors 15, 41 and 45 becomes more positive, thereby increasing the mutual conductance of the reactance tube 35 and hence the effective value of the capacitance 49. As the value of the capacitance 49 increases, the alternating potential applied to the grid electrode of the rectifier tube 19 is increasingly delayed, thereby decreasing the conducting interval of the rectifier tube during each cycle of the applied alternating potential, since the control electrode bias reaches the firing potential of the gaseous discharge tube 19 at a later time, hence tending to reduce the rectified voltage applied to the load device 25. The circuit will approach equilibrium quite rapidly so that variations in the applied alternating potential will be substantially compensated to provide a well regulated rectified load voltage.

Figure 3 is illustrative of the potentials applied to the gaseous discharge rectifier tube for different values of load potential. In Figure 3a, the positive half cycle of the alternating potential applied to the anode electrode of the rectifier tube 19 is indicated by the solid graph 51. Under conditions of substantially zero time delay, the corresponding grid voltage applied to the grid electrode of the rectifier tube 19 is indicated by the graph 53 shown in dash lines.

Referring to Figure 3b, the delayed grid voltage 53', applied to the grid electrode of the gaseous discharge rectifier tube 19 in response to appreciable delay thereof provided by the capacitance 49, prevents the initiation of anode-to-cathode current through the rectifier tube 19 for an interval t corresponding to the delay introduced by the capacitance. Therefore, the anode-to-cathode current pulse, indicated by the solid graph 51', is of shorter duration than the anode current pulse indicated by the graph 51 of Figure 3a, which when integrated by the smoothing reactor 21 results in a reduction in effective load potential.

Referring to Figure 4, the rectifier tube 19 is connected in parallel with the load terminals 23, 27. The anode of the rectifier tube 19 is connected to the negative load terminal 27. The cathode of the rectifier tube 19 is connected to the positive load terminal 23. The alternating potential source 1 is connected directly to the positive output terminal 23 and to one terminal 11 of the resistor 15 of the first voltage divider 14. The remaining terminal of the alternating potential source 1 is connected to the cathode of a diode rectifier tube 55 and, through a series capacitor 57, to a first fixed terminal 59 of a switch 61. The anode of the diode rectifier 55 is connected to a second fixed switch terminal 63 of the switch 61. The movable contact of the switch 61 is connected to the remaining terminal 9 of the first voltage divider 14, and to the negative load terminal 27. The common terminal 17 of the first voltage divider 14 is connected to the control electrode of the reactance tube 35 and to the control electrode of the gaseous discharge rectifier tube 19. The anode of the reactance tube 35 is connected, through an anode resistor 39, to the positive load terminal 23, and is further connected through a coupling capacitor 47 to the control electrode of the rectifier tube 19. The cathode of the reactance tube 35 is connected to the negative load terminal 27 through the parallel-connected cathode resistor 41 and cathode capacitor 43. The reactance tube 35 is illustrated as a triode for the sake of simplicity.

The series capacitor 57 and diode 55 which may be selectively interposed, by means of the switch 61, between the alternating potential source 1 and the negative load terminal 27, are employed for the purpose of limiting or reducing the D.-C. current flow through the alternating potential source 1 during the non-conducting intervals of the rectifier tube 19, since otherwise the A.-C. source would comprise at such times an effective D.-C. short-circuit across the load terminals 23, 27.

It will be seen that the reactance tube 35 is oppositely-phased with respect to the rectifier tube 19 in order to provide proper phasing of the delay of the alternating potentials applied to the grid electrode of the rectifier tube 13 in response to variations in the load voltage. The theory of operation of the circuit is similar to that described in the circuit of Fig. 2, with the exception that in the circuit of Fig. 4 the rectifier tube 19 is non-conducting during intervals wherein rectified voltage pulses are applied to the load terminals 23, 27. A conventional low-pass filter, not shown, may be interposed between the load terminals 23, 27 and a load device to smooth the rectified current pulsations as described in the circuit of Fig. 2.

Referring to Figure 5, the principles of the invention are applied to control the output voltage of a rectifier circuit for a three phase alternating voltage source. The source of three phase alternating potential, not shown, is applied, through input terminals 61, 63, 65, to a delta-connected transformer primary 67. The transformer secondary comprises Y-connected winding 69, 71, 73 having a common terminal 75 connected to the negative load terminal 27. The remaining terminals of the Y-connected secondary windings 69, 71, 73 are connected, respectively, to the anodes of first, second and third grid-controlled gaseous discharge rectifier tubes 77, 79, 81. The cathodes of the three rectifier tubes are connected together and connected to the positive load terminal 23.

A first voltage divider 83, connected across the first transformer secondary winding 69, has an intermediate terminal 85 connected to the grid electrode of the first rectifier tube 77. Similarly, a second voltage divider 87, connected across the second secondary transformer winding 71, has an intermediate terminal 89 connected to the grid electrode of the second rectifier tube 79. Likewise, a third voltage divider 91, connected across the third transformer secondary winding 73, has an intermediate terminal 93 connected to the grid electrode of the third rectifier tube 81. The grid electrodes of the rectifier tubes 77, 79, 81 are connected, through coupling capacitors 95, 97, 99 respectively, to the control electrode of a tetrode reactance tube 35.

The control electrode of the reactance tube 35 is connected to an intermediate terminal 101 upon a fourth voltage divider 103 comprising the serially-connected resistors 105, 107, 109. The end terminals of the fourth voltage divider 103 are connected between the load terminals 23, 27. A second intermediate terminal 111 on the fourth voltage divider 103 is connected to the screen electrode of the reactance tube 35, and is further connected through a bypass capacitor 113 to the negative load terminal 27. The cathode of the reactance tube 35 is connected to the negative load terminal 27 through a parallel-connected cathode resistor 41 and cathode capacitor 43. The anode of the reactance tube 35 is connected to the positive load terminal through an anode resistor 39.

In addition, the anode of the reactance tube 35 is coupled to the common terminals of the coupling capacitors 95, 97, 99 through a common second coupling capacitor 115, whereby variations in the mutual conductance of the reactance tube 35 in response to changes in load voltage varies the delay of the alternating potentials applied to the grid electrodes of the several gaseous discharge rectifier tubes.

It will be seen that the load voltage may be employed to control the mutual conductance of a single reactance tube, which controls effectively the delay of the alternating potential voltage phase applied to the grid of each of the rectifier tubes with respect to the voltage phase of the potential applied to the anode thereof, in a manner to regulate the conducting interval of each of the rectifier tubes during each cycle of the applied multi-phase alternating potential.

Thus the invention comprises several modifications of an improved circuit wherein the conducting interval of a gaseous discharge rectifier tube is effectively controlled during each cycle of the applied alternating potential in response to variations in the mutual conductance of a reactance tube responsive to the rectified load potential. The invention is illustrated for the control of both single-phase and multi-phase rectifier circuits.

I claim as my invention:

1. A voltage regulator circuit comprising a gaseous discharge rectifier tube, means for applying alternating potentials to said tube to derive rectified potentials therefrom, a reactance tube responsive to said alternating and rectified potentials, and means including said reactance tube connected to said gaseous rectifier tube for controlling the conducting interval of said gaseous rectifier tube for each cycle of said applied alternating potentials in response to the effective reactance of said reactance tube to regulate the magnitude of said derived rectified potentials.

2. A voltage regulating rectifier circuit connecting a source of alternating potential to a load comprising a gaseous discharge rectifier tube interposed between said source and said load, a reactance tube responsive to said alternating potential and to at least a portion of the rectified potentials applied to said load, and means including said reactance tube connected to said gaseous rectifier tube for controlling the conducting interval of said rectifier tube for each cycle of said applied alternating potential in response to the effective reactance of said reactance tube to regulate the magnitude of said rectified potentials applied to said load.

3. A voltage regulating rectifier circuit connecting a source of alternating potential to a load comprising a gaseous discharge rectifier tube serially interposed between said source and said load, a reactance tube responsive to said alternating potential and to at least a portion of the rectified potentials applied to said load, and means including said reactance tube connected to said gaseous rectifier tube for controlling the conducting interval of said rectifier tube for each cycle of said applied alternating potential in response to the effective reactance of said reactance tube to regulate the magnitude of said rectified potentials applied to said load.

4. A voltage regulator circuit comprising a gaseous discharge rectifier tube having an anode, a cathode and at least one control electrode, means for applying alternating potentials to said tube to derive rectified potentials therefrom, a reactance tube responsive to said alternating and rectified potentials, and means including said reactance tube connected to a control electrode of said gaseous rectifier tube for controlling the conducting interval of said gaseous rectifier tube for each cycle of said applied alternating potentials in response to the effective reactance of said reactance tube to regulate the magnitude of said derived rectified potentials.

5. A voltage regulating rectifier circuit connecting a source of alternating potential to a load comprising a gaseous discharge rectifier tube having an anode, a cathode and at least one control electrode serially interposed between said source and said load, a reactance tube responsive to said alternating potential and to at least a portion of the rectified potentials applied to said load, and means including said reactance tube connected to a control electrode of said gaseous rectifier tube for controlling the conducting interval of said rectifier tube for each cycle of said applied alternating potential in response to the effective reactance of said reactance tube to regulate the magnitude of said rectified potentials applied to said load.

6. A voltage regulating rectifier circuit connecting a source of alternating potential to a load comprising a gaseous discharge rectifier tube connected in shunt with said load, a reactance tube responsive to said alternating potential and to at least a portion of the rectified potentials applied to said load, and means including said reactance tube connected to said gaseous rectifier tube for controlling the conducting interval of said rectifier tube for each cycle of said applied alternating potential in response to the effective reactance of said reactance tube to regulate the magnitude of said rectified potentials applied to said load.

7. A voltage regulating rectifier circuit connecting a source of alternating potential to a load comprising a gaseous discharge rectifier tube having an anode, a cathode and at least one control electrode serially interposed between said source and said load, a reactance tube having an anode, a cathode and at least one control electrode, at least one of said reactance tube control electrodes being responsive to said alternating potential and to at least a portion of the rectified potentials applied to said load, and means including said reactance tube anode-cathode circuit connected to a control electrode of said gaseous rectifier tube for controlling the conducting interval of said rectifier tube for each cycle of said applied alternating potential to regulate the magnitude of said rectified potentials applied to said load.

8. A voltage regulating rectifier circuit connecting a source of alternating potential to a load comprising a gaseous discharge rectifier tube having an anode, a cathode and at least one control electrode interposed between said source and said load, a reactance tube having an anode, a cathode and at least one control electrode, at least one of said reactance tube control electrodes being responsive to said alternating potential and to at least a portion of the rectified potentials applied to said load, and means including a capacitor serially interposed with said reactance tube anode-cathode circuit connected to a control electrode of said gaseous rectifier tube for controlling the conducting interval of said rectifier tube for each cycle of said applied alternating potential to regulate the magnitude of said rectified potentials applied to said load.

9. Apparatus of the type described in claim 8 including a voltage divider connected in parallel with said source of alternating potential and a connection from a control electrode of each of said rectifier and reactance tubes to an intermediate point on said voltage divider.

10. A voltage regulating rectifier circuit connecting a source of alternating potential to a load comprising a gaseous rectifier tube having an anode, a cathode and at least one control electrode serially interposed between said source and said load, a reactance tube having an anode, a cathode and at least one control electrode, said reactance tube control electrodes each being responsive to at least a portion of the rectified potentials applied to said load, and means including a capacitor serially interposed with said reactance tube anode-cathode circuit connected to a control electrode of said gaseous rectifier tube for controlling the phase of the potentials applied to said rectifier tube control electrode and hence the conducting interval of said rectifier tube for each cycle of said applied alternating potential to regulate the magnitude of said rectified potentials applied to said load.

11. A multiphase voltage regulator circuit comprising a plurality of gaseous discharge rectifier tubes, means for applying alternating potentials of each phase to a different one of said rectifier tubes to derive rectified potentials therefrom, means for combining said derived potentials, a reactance tube responsive to said combined potentials, and means including said reactance tube connected to each of said rectifier tubes for controlling the conducting interval of each of said rectifier tubes for each cycle of said applied alternating potentials in response to the effective reactance of said reactance tube to regulate the magnitude of said combined rectified potentials.

12. A multiphase voltage regulator circuit comprising a plurality of gaseous discharge rectifier tubes each having an anode, a cathode and at least one control electrode, means for applying alternating potentials of each phase to a different one of said rectifier tubes to derive rectified potentials therefrom, means for combining said derived potentials, a reactance tube responsive to said combined potentials, and means including said reactance tube connected to a control electrode of each of said rectifier tubes for controlling the phase of said potentials applied to each of said control electrodes and hence the conducting interval of each of said rectifier tubes for each cycle of said applied alternating potentials in response to the effective reactance of said reactance tube to regulate the magnitude of said combined rectified potentials.

13. A voltage regulating rectifier circuit connecting a source of alternating potential to a load comprising a gaseous discharge rectifier tube having an anode, a cathode and at least one control electrode serially interposed between said source and said load, a reactance tube responsive to at least a portion of the rectified potentials applied to said load, and means including said reactance tube connected to a control electrode of said gaseous rectifier tube for controlling the time constant of said control electrode circuit of said rectifier tube and hence the conducting interval of said rectifier tube for each cycle of said applied alternating potential in response to the effective reactance of said reactance tube to regulate the magnitude of said rectified potentials applied to said load.

GEORGE C. SZIKLAI.

REFERENCES CITED

The following references are of record in the file of this patent:

UNITED STATES PATENTS

| Number | Name | Date |
| --- | --- | --- |
| 1,962,344 | Geiselman | June 12, 1934 |
| 1,995,404 | Stoller | Mar. 26, 1935 |
| 2,019,328 | Thompson | Oct. 29, 1935 |
| 2,083,382 | Jutson et al. | June 8, 1937 |
| 2,196,680 | Milarta | Apr. 9, 1940 |
| 2,229,968 | Garman | Jan. 28, 1941 |
| 2,315,619 | Hutcheson et al. | Apr. 6, 1943 |